UNITED STATES PATENT OFFICE.

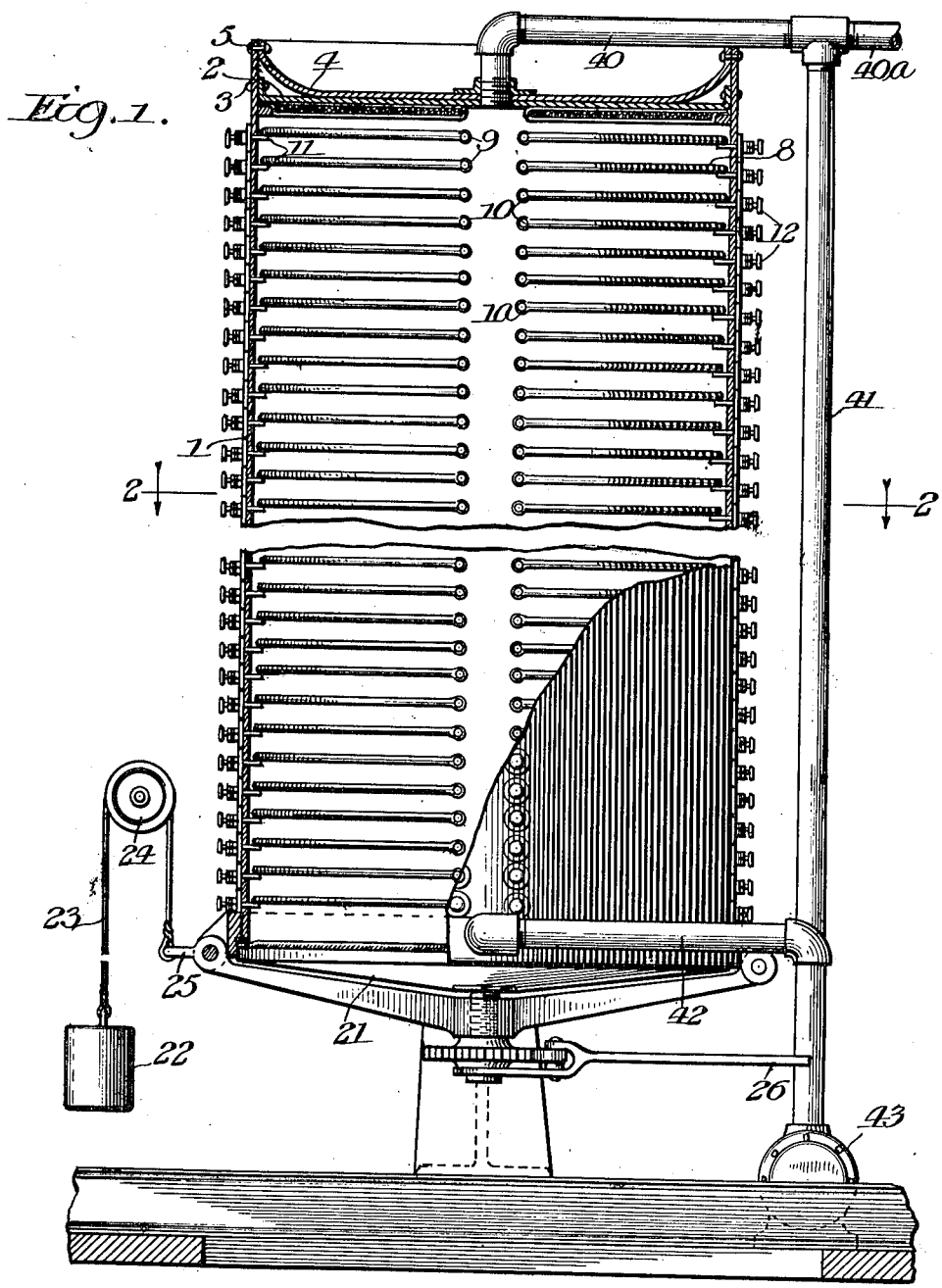

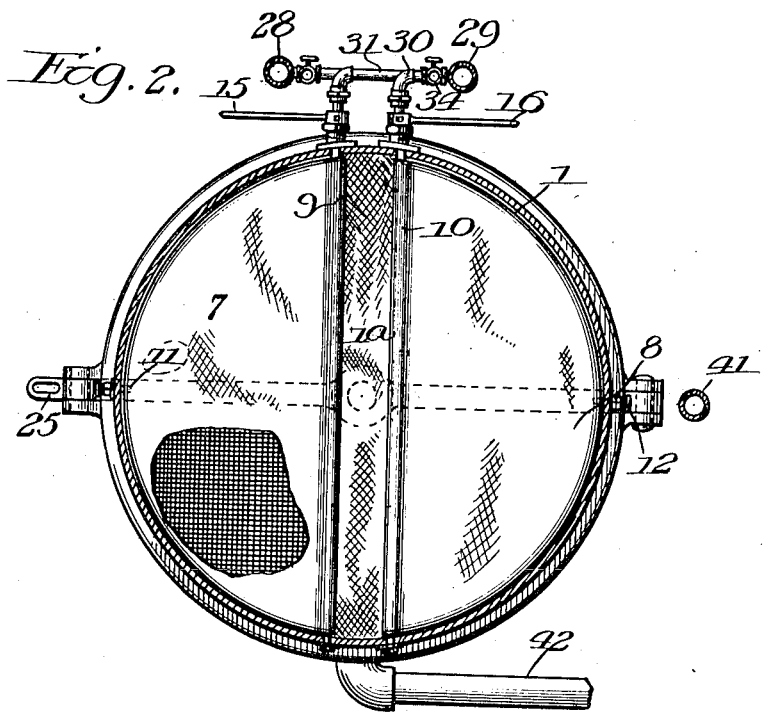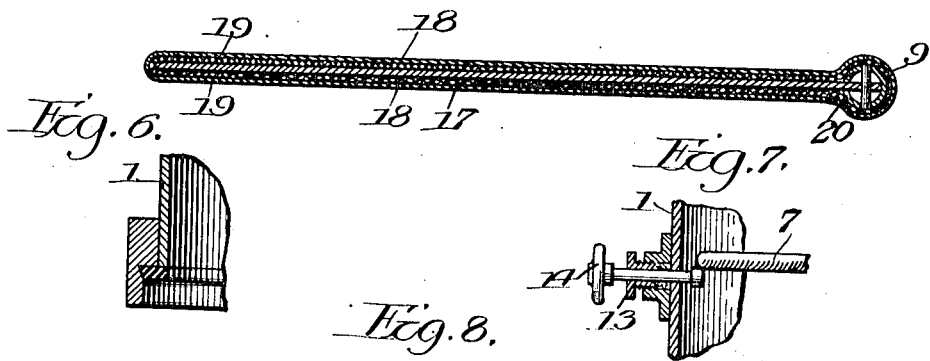

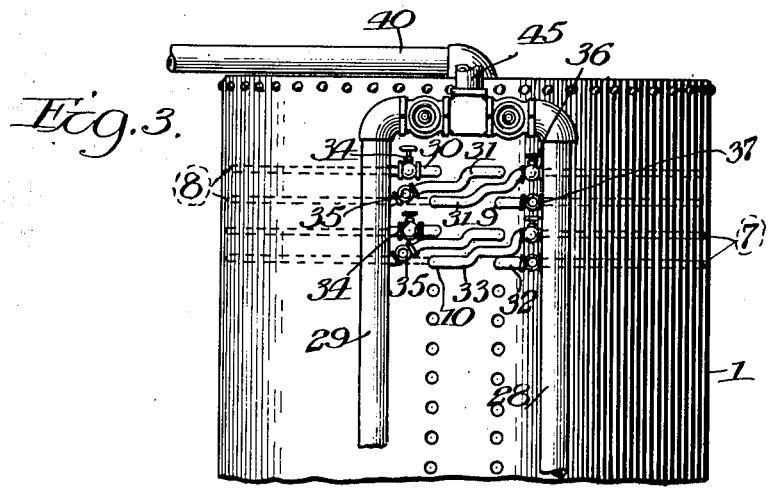
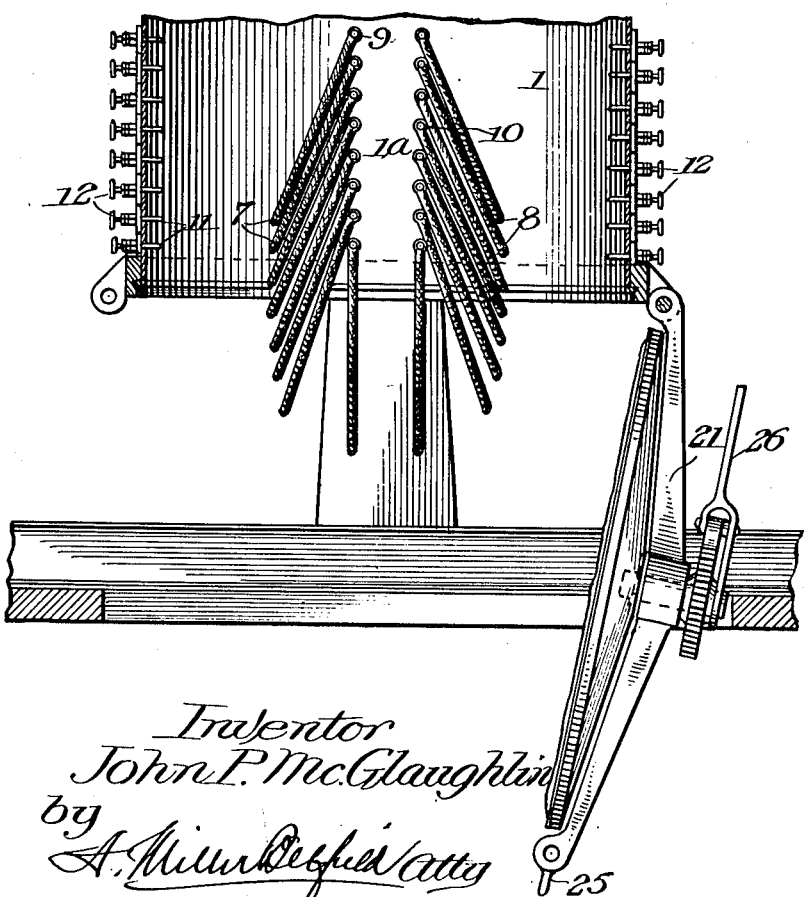

JOHN P. McGLAUGHLIN, OF CHICAGO, ILLINOIS.

FILTERING-PRESS.

1,292,342.   Specification of Letters Patent.   Patented Jan. 21, 1919.

Application filed May 5, 1917. Serial No. 166,543.

*To all whom it may concern:*

Be it known that I, JOHN P. McGLAUGHLIN, a citizen of the United States, residing at Chicago, in the county of Cook and State of Illinois, have invented a certain new and useful Improvement in Filtering-Presses, of which the following is a full, clear, concise, and exact description, reference being had to the accompanying drawings, forming a part of this specification.

My invention relates to filter presses.

One of the objects of the invention is to provide a practical and efficient construction of filter press.

Another object of the invention is to permit the solid matter to be quickly and effectively separated from the liquid matter, and especially to permit the solid matter to be thoroughly dried and then removed from the apparatus.

Another object of the invention is to permit the removal of any other materials which may have special value from the dry, solid material before the same is discharged or removed from the apparatus.

In the accompanying drawings Figure 1 is a vertical section of a filter press embodying my present invention;

Fig. 2 is a horizontal section taken on line 2—2 in Fig. 1;

Fig. 3 is a side elevation of the upper portion of the press;

Fig. 4 is a vertical section of the lower portion of the press, the view being similar to the view of Fig. 1, but the apparatus being in position to discharge;

Fig. 5 is a cross section of one of the leaves forming part of the apparatus;

Figs. 6 and 7 are views of details of construction;

Fig. 8 is a cross section of a modified form of leaf.

The apparatus shown comprises a casing 1 preferably made of cylindrical form and arranged in upright position. A top 2 is secured in position by means of rivets 3 and a supplemental top member 4 is arranged above the top 2 and secured by rivets 5. This forms a strong top capable of resisting the high pressure which is used internally in the apparatus. The member 4, it will be seen, has curved sides so as to form a convex arrangement particularly adapted to withstand internal pressure.

Within the casing 1 there are arranged two sets or series of leaves 7 and 8, these leaves being for the purpose of receiving and supporting the solid material to be filtered out of the material under treatment. These leaves 7 and 8 are pivotally mounted so as to permit them to swing vertically, being shown in their supported or horizontal positions in Fig. 1, and in their downwardly inclined or discharging positions in Fig. 4. As an arrangement for pivotally mounting these leaves there are provided a series of pipes 9 and 10 extending crosswise of the casing 1 and pivotally mounted at their ends in said casing as shown in Fig. 2. Thus each leaf can swing independently about its supporting pipe 9 or 10. As an arrangement for holding these leaves 7 and 8 in their supporting or horizontal positions, sliding stops 11 and 12 are provided, the former for the leaves 7 and the latter for the leaves 8. These stops as best shown in Fig. 7, are mounted in stepping boxes 13 and have exterior handles 14, by which they can be manipulated so as to slide them in and out, their inner ends supporting the leaves when in their inner positions, but permitting said leaves to drop when withdrawn from the edge portions of said leaves. In this way each leaf may be independently controlled and permitted to drop by the withdrawal of the corresponding stop, it being understood of course that in dropping the leaves the lower ones are released and dropped first. The pipes 9 and 10 are provided with operating handles 15 and 16, respectively, located outside of the casing 1 so as to permit the leaves 7 and 8 to be restored to horizontal or supporting positions.

Each of the leaves 7 and 8 is preferably made as shown in Fig. 5; so as to have a central portion 17 conveniently consisting of two flat metallic plates and side pieces or layers 18—18 of canvas or similar material which may be formed by stretching a piece of canvas entirely around the plates 17. Between the canvas 18 and plates 17 is arranged wire netting 19, one layer on each side of said plates 17. One or more apertures 20 in the pipe 9 afford communication between the interior of said pipe 9 and the space between the canvas layers 18.

At the lower end of the casing 1 is provided a swinging door or bottom 21 which may be swung up or down to close or open the filtering chamber formed by said casing 1. As an arrangement for holding the door 21 in an elevated or closed position, I show a weight 22 carried by a rope or cord 23 which layer is extended up over a pulley 24 and thence connected with a projection 25 on the door 21 so that the weight 22 holds said door in an elevated position. The door 21 is controlled by a rod 26 which can be manipulated to open and close said door.

The series of pipes 9 and 10 which serve as pivotal supports for the swinging leaves 7 and 8, are connected with pipes 28 and 29 respectively, the connection being such as to permit the rotary movement on the part of the pipes 9 and 10. There are certain connections between the pipes 28 and 29 and the series of pipes 9 and 10 by which fluid under pressure may be circulated through the pipes 9 and 10 in certain ways as will now be explained. Short pipes 30 extend from the pipe 29 to the first, third, fifth, and similar pipes 10, as best shown in Fig. 3. Other pipes 31 extend from said pipe 29 to the corresponding pipes 9, that is the first, third, fifth, seventh, and similar pipes 9. On the other side, short pipes 32 extend from the pipe 28 to the second, fourth, sixth and similar pipes 9. Other pipes 33 extend from said pipe 28 to the corresponding pipes 10. Thus the pipe 29 is connected with the first, third, fifth, seventh and similar leaves 7 and 8, or in other words with both of the odd leaves; while at the same time the other pipe 28 is connected with the second, fourth, sixth, eighth, and similar leaves 7 and 8, or in other words with both the even leaves. Suitable valves 34 control the pipes 30, valves 35 control the pipes 31, valves 36 control the pipes 33, and valves 37 control the pipes 32. In this way circulation between the pipes 28 and 29 and the series of leaves 7 and 8 may be controlled.

A pipe 40 for the material to be treated is connected with the top member 4 and communicates with the space between the leaves 7 and 8, as best shown in Fig. 1. This pipe 40 is extended by means of an extension 40ª to a suitable reservoir or apparatus in or by which the liquid to be treated is supplied. A circulation pipe 41 extends down from the pipe 40 and is connected with another pipe 42 which communicates with the bottom of the casing 1 at a point between said leaves 7 and 8. A pump 43 is understood to be connected between the pipes 41 and 42 for inducing a circulation in said pipes.

Thus in operation the material is fed into the pipe 40ª and thence into the pipe 40, and thence in the space or chamber 1ª between the series of leaves 7 and 8. Such material passes downwardly in said space and some of it passes out through the pipe 42 and is kept in circulation in said pipe 42 and the pipe 41 by means of the pipe 43. This continual circulation is augmented as the process goes on by further material coming through the side 40ª. The material being circulated through the apparatus deposits solid matter upon the leaves 7 and 8, depositing it first upon the lowest of said leaves. As the process continues the lowermost leaves become covered and a substantial layer of solid material is deposited upon the lowermost leaves and then upon the upper ones until all of said leaves are practically covered. This layer of material becomes practically as high or thick as the various spaces between the successive leaves, so that the apparatus becomes practically filled with solid material in the portions thereof containing the leaves 7 and 8. During this circulation there is pressure applied through the pipes 28 and 29, so that liquid will be withdrawn from the treatment chamber formed by the casing 1, through the canvas walls 18 of the leaves 7 and 8 and through the pipes 9 and 10 into said pipes 28 and 29. In this way the drying is assisted, the circulation of matter to be treated in the pipes 40, 41, 42, and the treatment chamber, taking place and continually agitating the material in the chamber and causing the deposit of the solid material upon the leaves or shelves in the treatment chamber, while at the same time the liquid is being continually withdrawn through the tubes or pipes 9 and 10, and 28 and 29, and carried away through the drain pipe 45 (Fig. 3).

The separation or filtration having thus been brought about and the solid matter having been deposited upon the leaves or shelves 7 and 8, such matter may be withdrawn or discharged from the apparatus by opening the bottom 21 and then lowering the leaves or shelves 7 and 8, one by one by withdrawing the slides 11 one after another. The solid material slides off from the shelves and drops down out of the treatment chamber and is collected in some suitable manner. After all of the material has been discharged from all of the leaves or shelves the same are swung up to their horizontal or collecting positions by means of the levers 15 and 16, and the door or bottom 21 is closed and sealed and the process is thereupon repeated.

If there are certain food or other values in the dry material deposited on the shelves, which it is desired to extract before withdrawing said material, such values may be extracted by means of fluid, as for example water circulated through the pipes 9, 10, 28 and 29. To do this water may be injected or introduced into one of the pipes, for example 28, and passed from the same into and through the second, fourth, sixth and similar pipes 9 and 10, and thence out by means of the intermediate or alternate pipes 9 and 10 into and through the pipe 29. This circulation of water is carried on for a sufficient length of time to extract the food values from the layers of material on the even leaves 7 and 8. The direction of circulation is then reversed, passing the water from the pipe 29 into and through the odd pipes 9 and 10, and the leaves supported thereby and thence back through the pipe 28, thereby extracting the food values from the layers of material on top of the odd leaves 7 and 8. The liquid thus circulated and thus containing the food values is taken care of and such food values taken advantage of in any desired way. After this the layers of material on top of the leaves 7 and 8 are discharged as previously described.

Thus it will be seen that the apparatus permits effective and efficient action and also that the solid material in as dry a condition as desired may be discharged from the apparatus in a very simple and easy manner.

It will be understood that changes and modifications may be made without departing from the spirit of the invention.

What I claim is:

1. An apparatus of the class specified comprising a casing forming a treatment chamber, shelves for the deposit of material within said chamber, said shelves being arranged in vertical series and extending substantially across the cross sectional area of the treatment chamber except for a vertical space for the vertical flow of liquid to be treated, means for mounting said shelves so as to permit them to be inclined downwardly, and means for opening the lower portion of the casing to permit the withdrawal of material deposited upon said shelves and removed from the same by tilting.

2. An apparatus of the class specified comprising a casing forming a treatment chamber, two vertical series of shelves arranged within said chamber, the two series being arranged side by side with a space between them and the shelves extending across substantially the entire cross sectional area of the casing excepting said space, means for mounting the shelves so as to permit the shelves to be tilted or inclined downwardly, and means for opening the lower portion of the casing to permit the withdrawal of the material removed from the shelves.

3. An apparatus of the class specified comprising a casing forming a treatment chamber, a series of shelves mounted in said casing, pipes on which said shelves are mounted so that the latter may swing up and down and pipe connections with said pivotal pipes whereby fluid may be circulated through the latter.

4. An apparatus of the class specified comprising a cylindric casing, shelves mounted in vertical rows therein, cross pipes on which said shelves are mounted for swinging motion and other pipes with which said shelf supporting pipes are connected, said shelves being constructed with layers of permeable material forming chambers communicating with said supporting pipes, whereby a circulation may be induced through said supporting pipes and said shelves.

5. An apparatus of the class specified, comprising a cylindric casing, shelves mounted in vertical rows therein, cross pipes on which said shelves are mounted for swinging motion and other pipes with which said shelf supporting pipes are connected, said shelves being constructed with layers of permeable material forming chambers communicating with said supporting pipes, whereby a circulation may be induced through said supporting pipes and said shelves, said supporting pipes being provided with exterior layers by which said shelves may be swung.

6. An apparatus of the class specified comprising a cylindric casing forming a treatment chamber, leaves or shelves arranged horizontally in vertical rows within said chamber, cross pipes on which said shelves are mounted for swinging motion, and stops mounted in the wall of said casing and having their inner ends arranged to engage and support the free ends of said shelves, said stops being adapted to be moved so as to withdraw their ends from supporting positions in connection with said shelves, and supply pipes arranged alongside of said casing and having connections with said shelf supporting pipes.

7. An apparatus of the class specified comprising a cylindric casing forming a treatment chamber, leaves or shelves arranged horizontally in vertical rows within said chamber, cross pipes on which said shelves are mounted for swinging motion, and stops mounted in the wall of said casing and having their inner ends arranged to engage and support the free ends of said shelves, said stops being adapted to be moved so as to withdraw their ends from supporting positions in connection with said shelves, and supply pipes arranged alongside of said casing and having connections with said shelf supporting pipes, said connections being so arranged that shelves on one level are connected with one pipe and shelves on the next level are connected with the other pipe, and so on.

8. An apparatus of the class specified comprising a casing forming a treatment chamber, two vertical series of shelves arranged within said treatment chamber with a vertical space between the two series, the shelves otherwise extending substantially across the cross sectional area of the treatment chamber, and means for opening the lower portion of the casing to permit the withdrawal of material deposited on the shelves and then removed therefrom.

In witness whereof, I hereunto subscribe my name this 18th day of April, A. D. 1917.

JOHN P. McGLAUGHLIN.

Witnesses:
O. M. WERMICH,
A. L. JONES.